(12) United States Patent
Farhat et al.

(10) Patent No.: US 10,800,447 B2
(45) Date of Patent: Oct. 13, 2020

(54) STEERING SYSTEM WITH MULTIPLE CONTROLLERS

(71) Applicant: Ford Global Technologies, LLC, Dearborn, MI (US)

(72) Inventors: Mohamad Wajih Issam Farhat, Dearborn, MI (US); Steven R. El Aile, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 260 days.

(21) Appl. No.: 16/112,034

(22) Filed: Aug. 24, 2018

(65) Prior Publication Data

US 2020/0062298 A1    Feb. 27, 2020

(51) Int. Cl.
*B62D 6/00* (2006.01)
*B62D 5/04* (2006.01)

(52) U.S. Cl.
CPC ......... *B62D 5/0463* (2013.01); *B62D 5/0493* (2013.01); *B62D 6/00* (2013.01)

(58) Field of Classification Search
CPC ....... B62D 5/0493; B62D 6/00; B62D 5/0463
USPC ......................................................... 701/41
See application file for complete search history.

(56) References Cited

U.S. PATENT DOCUMENTS

| 7,154,244 | B2* | 12/2006 | Asaumi ................. | B62D 5/046 318/599 |
| 7,222,008 | B2 | 5/2007 | Takahashi et al. | |
| 7,302,328 | B2* | 11/2007 | Kato ..................... | B60T 8/1764 180/443 |
| 8,897,968 | B2 | 11/2014 | Suzuki | |
| 9,457,838 | B2* | 10/2016 | Tsunoda ................ | B62D 5/049 |
| 2008/0243339 | A1* | 10/2008 | Nishimori ............. | B60G 7/003 701/41 |
| 2013/0113471 | A1* | 5/2013 | Ura ....................... | G01D 5/20 324/207.25 |
| 2016/0164447 | A1* | 6/2016 | Wu ........................ | H02P 29/032 180/443 |
| 2019/0241207 | A1* | 8/2019 | Jeong ................... | B62D 5/0493 |
| 2019/0256129 | A1* | 8/2019 | Oka ...................... | H02P 21/0003 |
| 2020/0049287 | A1* | 2/2020 | Petrou .................. | F16L 27/082 |

FOREIGN PATENT DOCUMENTS

| DE | 102013203978 A1 | 9/2014 |
| JP | 4382345 B2 | 12/2009 |

* cited by examiner

*Primary Examiner* — Yazan A Soofi
(74) *Attorney, Agent, or Firm* — Raymond L. Coppiellie; Bejin Bieneman PLC

(57) ABSTRACT

A system for a vehicle includes first and second electronic control units (ECUs) each electrically connected to a steering-system motor, and a computer. The computer is programmed to instruct the first and second ECUs to each provide one-half of a value of a torque signal to the steering-system motor upon determining that both ECUs have a full performance capability.

20 Claims, 3 Drawing Sheets

STEERING SYSTEM WITH MULTIPLE CONTROLLERS

BACKGROUND

A steering system for a vehicle controls the turning of the wheels. Types of steering systems include rack-and-pinion systems, often with electric power-assisted steering; other mechanical arrangements; and steer-by-wire systems. The steering system typically includes an electronic control unit (ECU) that is in communication with and receives input from a controller and/or a human driver. The human driver typically controls the steering system via a steering wheel.

DETAILED DESCRIPTION

Figure 1:
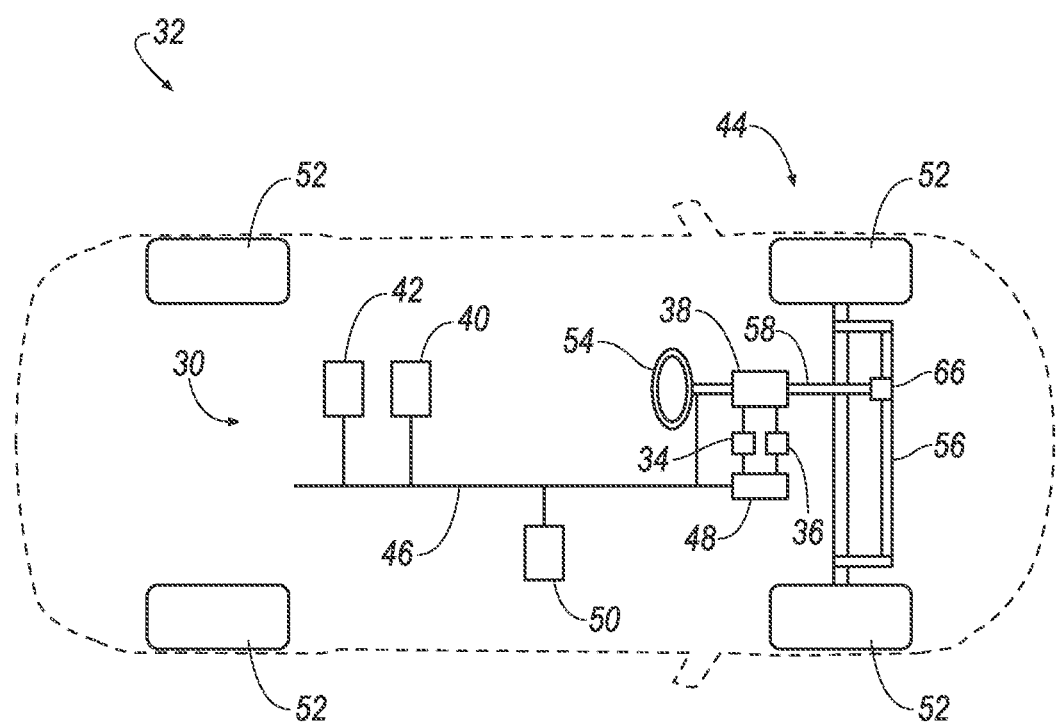
FIG. 1 is diagram of an example steering system in a vehicle.

A system includes first and second ECUs each electrically connected to a steering-system motor, and a computer programmed to instruct the first and second ECUs to each provide one-half of a value of a torque signal to the steering-system motor upon determining that both ECUs have a full performance capability.

The steering-system motor may be a six-phase electric motor. The first ECU may be electrically connected to a set of three coil pairs of the steering-system motor, and the second ECU may be electrically connected to a set of the other three coil pairs of the steering-system motor.

The steering-system motor may be a steer-by-wire torque actuator.

The steering-system motor may be an electric power-assist steering motor.

The computer may be further programmed to instruct the first ECU to provide more than one-half of the value of the torque signal to the steering-system motor upon determining that the second ECU has a reduced performance capability. The computer may be further programmed to calculate a torque-scaling value for the first ECU, and instruct the first ECU to provide the torque-scaling value multiplied by the value of the torque signal to the steering-system motor upon determining that the second ECU has a reduced performance capability, and the torque-scaling value may compensate for the reduced performance capability of the second ECU. The torque-scaling value may have a maximum value of 1.

The torque-scaling value may equal a difference of 1 and a product of one-half and the reduced performance capability of the second ECU, divided by the performance capability of the first ECU.

The computer may be further programmed to instruct the second ECU to provide more than one-half of the value of the torque signal to the steering-system motor upon determining that the first ECU has a reduced performance capability.

A computer may include a processor and a memory storing processor-executable instructions, and the processor is programmed to instruct first and second ECUs to each provide one-half of a value of a torque signal to a steering-system motor upon determining that both ECUs have a full performance capability, and instruct the first ECU to provide more than one-half of the value of the torque signal to the steering-system motor upon determining that the second ECU has a reduced performance capability.

The processor may be further programmed to calculate a torque-scaling value for the first ECU, and instruct the first ECU to provide the torque-scaling value multiplied by the value of the torque signal to the steering-system motor based on determining that the second ECU has a reduced performance capability, and the torque-scaling value may compensate for the reduced performance capability of the second ECU. The torque-scaling value may have a maximum value of 1.

The torque-scaling value may equal a difference of 1 and a product of one-half and the reduced performance capability of the second ECU, divided by the performance capability of the first ECU. The processor may be further programmed to instruct the second ECU to provide more than one-half of the value of the torque signal to the steering-system motor upon determining that the first ECU has a reduced performance capability.

A method includes instructing first and second ECUs to each provide one-half of a value of a torque signal to a steering-system motor upon determining that both ECUs have a full performance capability, and instructing the first ECU to provide more than one-half of the value of the torque output signal to the steering-system motor upon determining that the second ECU has a reduced performance capability.

The method may further include calculating a torque-scaling value for the first ECU, and instructing the first ECU to provide the torque-scaling value multiplied by the value of the torque signal to the steering-system motor based on determining that the second ECU has a reduced performance capability, and the torque-scaling value may compensate for the reduced performance capability of the second ECU. The torque-scaling value may have a maximum value of 1.

The torque-scaling value may equal a difference of 1 and a product of one-half and the reduced performance capability of the second ECU, divided by the performance capability of the first ECU.

The method may further include instructing the second ECU to provide more than one-half of the value of the torque signal to the steering-system motor upon determining that the first ECU has a reduced performance capability.

With reference to the Figures, a system 30 for a vehicle 32 includes first and second electronic control units (ECUs) 34, 36 each electrically connected to a steering-system motor 38, and a computer 40. The computer 40 is programmed to instruct the first and second ECUs 34, 36 to each provide one-half of a value of a torque signal to the steering-system motor 38 upon determining that both ECUs 34, 36 have a full performance capability.

The system 30 provides redundancy for steering the vehicle 32, and the vehicle 32 may be able to continue steering even if either the first ECU 34 or the second ECU 36 fails or has a reduced performance capacity. The system 30, as described below, can compensate for the failure of one of the ECUs 34, 36 by increasing the output of the other of the ECUs 34, 36, which can minimize understeer in the event of the failure of one of the ECUs 34, 36.

With reference to FIG. 1, the vehicle 32 may be any passenger or commercial automobile such as a car, a truck, a sport utility vehicle, a crossover, a van, a minivan, a taxi, a bus, etc.

The vehicle 32 may be an autonomous vehicle or a conventional vehicle with only manual driving controls. The computer 40 can be programmed to operate the vehicle 32 independently of the intervention of a human driver, completely or to a lesser degree. A vehicle computer 42 may be programmed to operate a propulsion, a brake system, a steering system 44, and/or other vehicle systems. For the purposes of this disclosure, autonomous operation means the vehicle computer 42 controls the propulsion, brake system, and steering system 44 without input from a human driver; semi-autonomous operation means the vehicle computer 42 controls one or two of the propulsion, brake system, and steering system 44 and a human driver controls the remainder; and nonautonomous operation means a human driver controls the propulsion, brake system, and steering system 44.

The vehicle computer 42 is a microprocessor-based computer. The vehicle computer 42 includes a processor, memory, etc. The memory of the vehicle computer 42 includes memory for storing instructions executable by the processor as well as for electronically storing data and/or databases.

The computer 40 is one or more microprocessor-based computers. The computer 40 includes memory, at least one processor, etc. The memory of the computer 40 includes memory for storing instructions executable by the processor as well as for electronically storing data and/or databases. The computer 40 may be the same computer as the vehicle computer 42, or the computer 40 may be one or more separate computers in communication with the vehicle computer 42 via a communications network 46, or the computer 40 may encompass multiple computers including the vehicle computer 42. As a separate computer, the computer 40 may be or include, e.g., one or more control modules such as a power-steering control module 48.

The computer 40 may transmit and receive data through the communications network 46 such as a controller area network (CAN) bus, Ethernet, WiFi, Local Interconnect Network (LIN), onboard diagnostics connector (OBD-II), and/or by any other wired or wireless communications network. The computer 40 may be communicatively coupled to the vehicle computer 42, the power-steering control module 48, the first ECU 34, the second ECU 36, steering sensors 50, and other components via the communications network 46.

The steering system 44 is typically a conventional vehicle steering subsystem and controls the turning of road wheels 52. The steering system 44 may be a rack-and-pinion system with electric power-assisted steering, a steer-by-wire system, or any other suitable system. The steering system 44 includes the first and second ECUs 34, 36 that are in communication with and receive input from the computer 40 (e.g., the vehicle computer 42 and/or the power-steering control module 48) and/or a human driver. The human driver may control the steering system 44 via, e.g., a steering wheel 54, handheld remote control (not shown), etc.

The steering system 44 may be a conventional rack-and-pinion steering system. Alternatively or additionally, the steering system 44 may be a Pitman-arm system, a rear-steer system, etc. (not shown). A steering rack 56 may be turnably coupled to the road wheels 52, for example, in a four-bar linkage. The position of the steering rack 56 determines the turning of the road wheels 52. Translational motion of the steering rack 56 results in turning of the road wheels 52. A steering column 58 may be coupled to the steering rack 56 via a rack and pinion 60, that is, gear meshing between a pinion gear and a rack gear (not shown).

The steering column 58 transfers rotation of the steering wheel 54 to movement of the steering rack 56. The steering column 58 may be, e.g., a shaft connecting the steering wheel 54 to the steering rack 56. The steering column 58 may house a clutch and one or more of the steering sensors 50 such as a torque sensor (not shown).

The steering wheel 54 allows an operator to steer the vehicle 32 by transmitting rotation of the steering wheel 54 to movement of the steering rack 56. The steering wheel 54 may be, e.g., a rigid ring fixedly attached to the steering column 58.

The first and second ECUs 34, 36 are microprocessor-based controllers. The ECUs 34, 36 each include a processor, memory, etc. The memories of the ECUs 34, 36 each include memory for storing instructions executable by the processor as well as for electronically storing data and/or databases.

The steering-system motor 38 is coupled to the steering system 44, e.g., the steering column 58, so as to cause turning of the road wheels 52. For example, the steering-system motor 38 may be an electric motor rotatably coupled to the steering column 58, that is, coupled so as to be able to apply a steering torque to the steering column 58. The steering-system motor 38 may provide power assist to the steering system 44. In other words, the steering-system motor 38 may provide torque in a direction in which the steering wheel 54 is being rotated by a human driver, allowing the driver to turn the steering wheel 54 with less effort. The steering-system motor 38 may be an electric power-assist steering motor.

Alternatively to the rack-and-pinion steering system, the steering system 44 may be a steer-by-wire steering system, i.e., may have a gap in mechanical linkages between the steering wheel 54 and the road wheels 52. If the vehicle 32 is a fully autonomous vehicle, the steering system 44 may be a steer-by-wire steering system lacking the steering wheel 54 and the steering column 58. The computer 40 may receive signals from the steering sensors 50, e.g., a position sensor positioned to detect the orientation of the steering wheel 54. The position sensor may be, e.g., a Hall effect sensor, a rotary encoder, etc. The computer 40 may output a signal to the steering-system motor 38 via the first and second ECUs 34, 36. The steering-system motor 38 may transform the signal into mechanical motion of the steering rack 56. The steering-system motor 38 may be a steer-by-wire torque actuator. The steering-system motor 38 may be one or more electromechanical actuators coupled to the steering rack 56 in lieu of or via the rack and pinion 60.

The steering sensors 50 provide data about components of the steering system 44. For example, the steering sensors 50 include wheel-speed sensors for the road wheels 52; position sensors on components of the steering system 44 such as the steering wheel 54, the steering column 58, the rack and pinion 60, or the steering rack 56; torque sensors on components of the steering system 44 such as the steering column 58, the rack and pinion 60, or the steering actuator; and/or electrical sensors such as voltmeters, etc. for electrical connections of the steering system 44 such as outputs of the first and second ECUs 34, 36.

Figure 2:
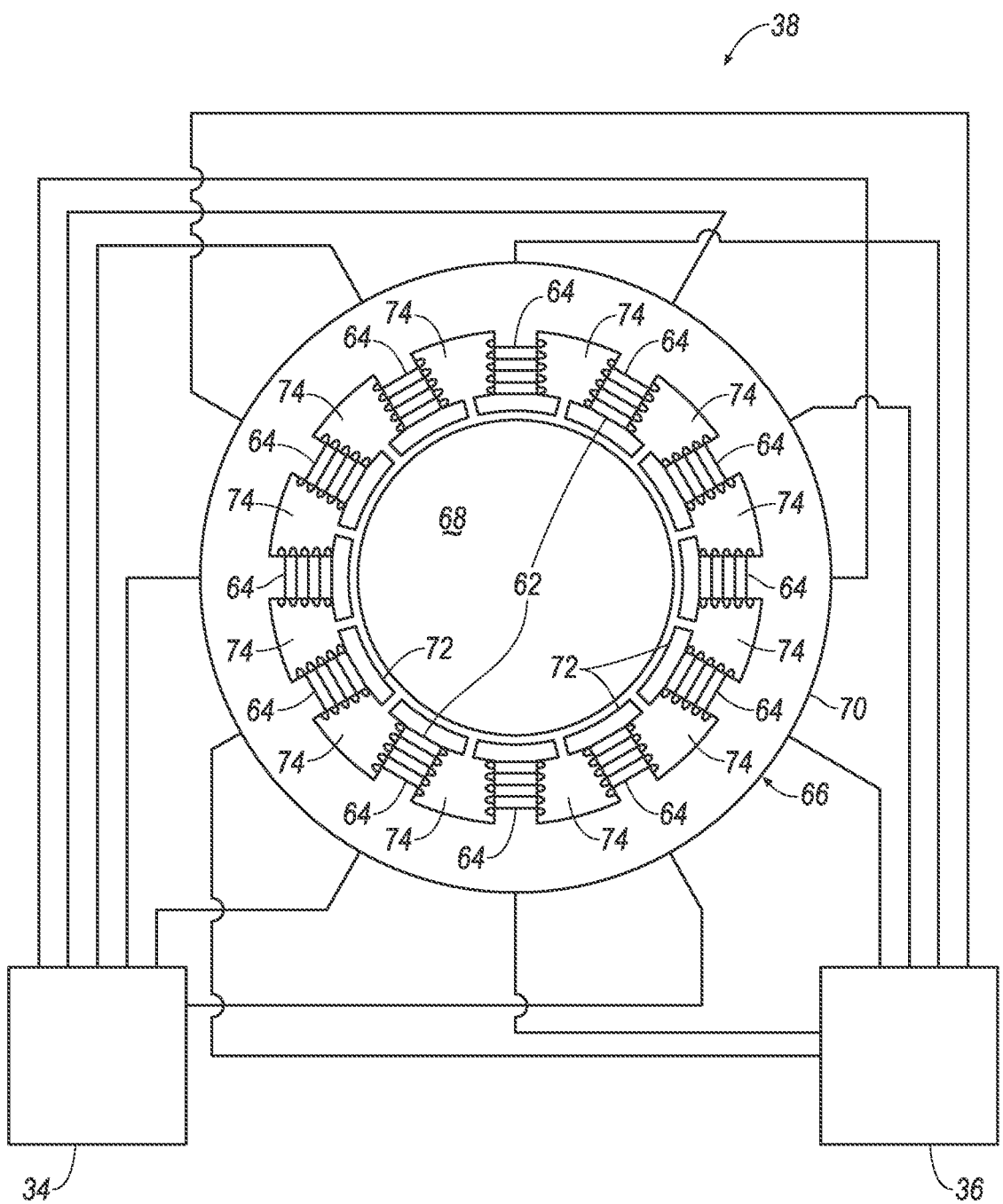
FIG. 2 is a diagram of a steering-system motor of the steering system of FIG. 1.

With reference to FIG. 2, the steering-system motor 38 may be a six-phase electric motor, i.e., may have six coil pairs 62, i.e., twelve coils 64. The steering-system motor 38 includes a stator 66 that is stationary and a rotor 68 that can rotate relative to the stator 66. The stator 66 includes a stator core 70 with poles 72 separated by slots 74, and the coils 64 wound around the poles 72 and through the slots 74. Each coil is several loops of wiring wrapped around one of the poles 72. The coils 64 are evenly spaced about an axis of rotation of the rotor 68. Each coil pair 62 includes two coils 64 positioned directly opposite each other relative to the rotor 68.

The first and second ECUs 34, 36 are each electrically connected to the steering-system motor 38. The first ECU 34 may be electrically connected to a first set of three coil pairs 62 of the steering-system motor 38. The second ECU 36 may be electrically connected to a second set of three coil pairs 62 of the steering-system motor 38. The second set of three coil pairs 62 includes the other three coil pairs 62 than those included in the first set of coil pairs 62, i.e., the three coil pairs 62 not included in the first set of coil pairs 62. In other words, the first and second sets of coil pairs 62 are mutually exclusive and exhaustive of the coil pairs 62. The first set of coil pairs 62 and the second set of coil pairs 62 alternate; in other words, each coil pair in the first set is circumferentially adjacent to two coil pairs 62 in the second set, and vice versa.

When a signal is sent from both the first ECU 34 and the second ECU 36, the steering-system motor 38 operates as a six-phase electric motor. When a signal is sent from only the first ECU 34 or only the second ECU 36, the steering-system motor 38 operates as a three-phase electric motor, with either the first set or the second set of coil pairs 62 active, and the other of the first set or the second set of coil pairs 62 inert.

In normal operation, the computer 40 transmits a torque signal to the first and second ECUs 34, 36. For the purpose of this disclosure, a "torque signal" is an electrical transmission defining a torque value, specifically, a desired torque to be generated by a motor, e.g., the steering-system motor 38. The torque signal includes information that, given a particular motor, maps onto a torque to be generated by that motor; for example, the torque signal may have a voltage that will cause the steering-system motor 38 to generate the torque, or the torque signal may have a value for torque encoded digitally.

Upon receiving the torque signal, the first and second ECUs 34, 36 transmit first and second output signals to the first and second set of coil pairs 62, respectively. The output signals specify desired torques to be generated by the respective set of coil pairs 62. The output signals may each have a voltage that maps onto the torque generated by the respective set of coil pairs 62. The output signals have values that are each a fraction of the value of the torque signal received by the first and second ECUs 34, 36, e.g., half of the value of the torque signal.

Figure 3:
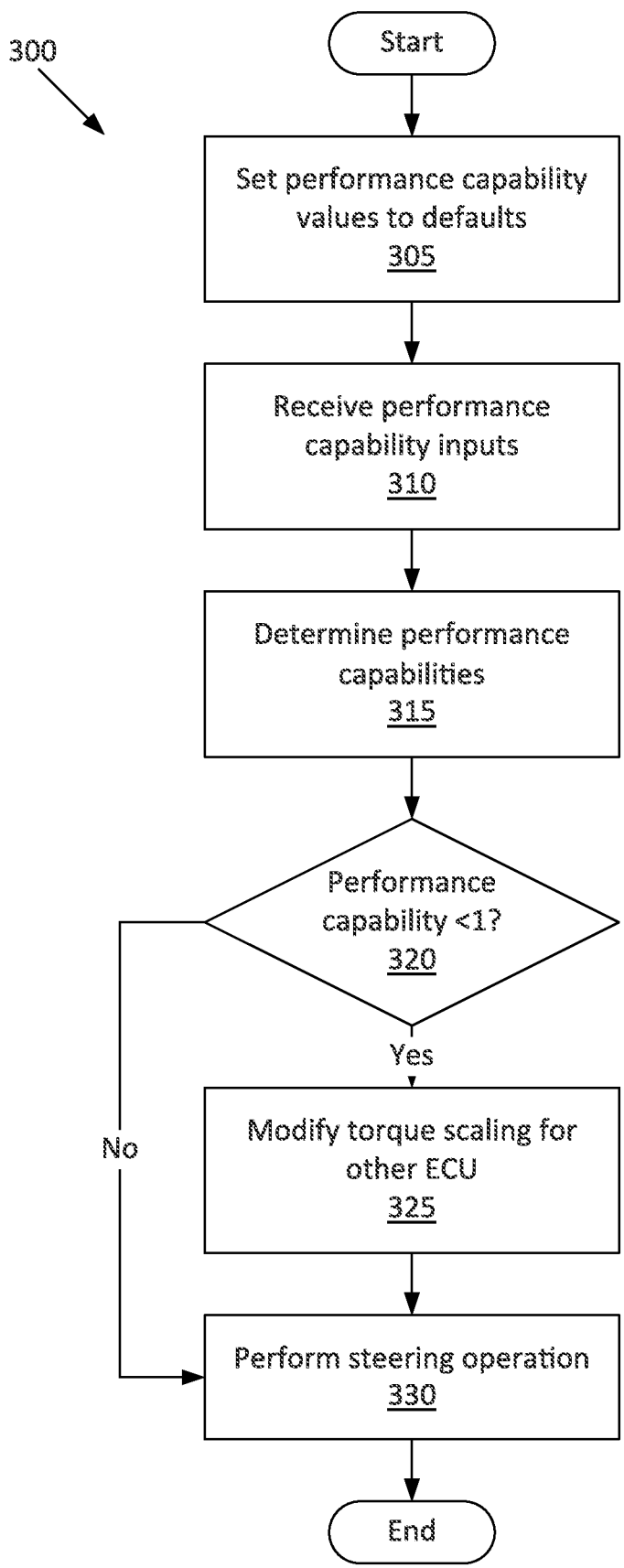
FIG. 3 is a process flow diagram of an example process for controlling the steering system.

FIG. 3 is a process flow diagram illustrating an exemplary process 300 for controlling the steering system 44. The memory of the computer 40 stores executable instructions for performing the steps of the process 300. In general, the computer 40 is programmed to instruct the first ECU 34 to provide half of the value of the torque signal from the computer 40 to the steering-system motor 38 upon determining that the second ECU 36 has a full performance capability, and to instruct the first ECU 34 to provide more than one-half of the value of the torque signal to the steering-system motor 38 upon determining that the second ECU 36 has a reduced performance capability. Note that the first and second ECUs 34, 36 are symmetrical, and that the first and second ECUs 34, 36 can be reversed throughout the process 300.

The process 300 begins in a block 305, in which the computer 40 sets performance capabilities and torque-scaling values for the first and second ECUs 34, 36 to default values. For the purposes of this disclosure, a "performance capability" is defined as an estimated fraction of a maximum output of a component that the component can currently output. The default values of the performance capabilities for the first and second ECUs 34, 36 may each be 1, i.e., 100%. The torque-scaling values are multipliers for converting the torque signal received by the first and second ECUs 34, 36 to the output signals from the first and second ECUs 34, 36. The default values of the torque-scaling values for the first and second ECUs 34, 36 may each be 0.5, i.e., each of the first and second ECUs 34, 36 may generate an output signal with a torque value equal to half the torque value of the torque signal, e.g., the torque signal has a value of 5 Newton-meters (N-m), and the output signals each have a value of 2.5 N-m. The default values may be prestored in the memory of the computer 40.

Next, in a block 310, the computer 40 receives data from the steering sensors 50. The data may include data indicative of a reduced performance capacity for the second ECU 36. For example, the data may include a temperature of the second ECU 36, a voltage at a terminal of the second ECU 36, a speed of the vehicle 32, friction within the steering system 44 as indicated by sluggish movement of components of the steering system 44, a fault code from the second ECU 36, etc.

Next, in a block 315, the computer 40 determines the performance capabilities of the first and second ECUs 34, 36. The computer 40 may select values for the performance capability from a lookup table based on the data from the steering sensors 50 received in the block 310. The conditions, thresholds, and values for the performance capability may be chosen based on testing the torque output of the steering-system motor 38 under different conditions. Here is an example lookup table.

| Condition | Value |
| --- | --- |
| $T > T_{threshold}$ | 0.5 |
| Fault code | 0 |
| $V_{max} < V_{threshold}$ | 0.25 |
| ... | ... |
| None | 1 |

For example, as shown in the table, if the temperature T for the second ECU 36 exceeds a temperature threshold $T_{threshold}$, then the computer 40 sets the performance capability for the second ECU 36 to 0.5. If a fault code is received from the second ECU 36, then the computer 40 sets the performance capability for the second ECU 36 to 0. If a maximum voltage $V_{max}$ from a terminal of the second ECU 36 is below a voltage threshold $V_{threshold}$, then the computer 40 sets the performance capability for the second ECU 36 to 0.25. If more than one condition applies, then the computer 40 may set the performance capability to the lowest of the applicable values, or the computer 40 may set the performance capability to 0. If no condition applies, the performance capability remains at 1.

Next, in a decision block 320, the computer 40 determines whether the second ECU 36 has a reduced performance capacity, i.e., has a performance capacity less than 1. If the performance capacity of the second ECU 36 is equal to 1, i.e., if the second ECU 36 has a full performance capability, then the process 300 proceeds to a block 330.

If the second ECU 36 has a performance capability less than 1, i.e., if the second ECU 36 has a reduced performance capability, then next, in a block 325, the computer 40 instructs the first ECU 34 to provide more than one-half of the value of the torque signal to the steering-system motor 38 upon receiving the torque signal. The computer 40 calculates a torque-scaling value for the first ECU 34. The torque-scaling value equals a difference of 1 and a product of one-half and the reduced performance capability of the second ECU 36, divided by the performance capability of the first ECU 34, i.e., $TS_1=(1-0.5*PC_2)/PC_1$, in which $TS_1$ is the torque-scaling value for the first ECU 34, $PC_2$ is the performance capability of the second ECU 36, and $PC_1$ is the performance capability of the first ECU 34. The torque-scaling value has a maximum value of 1. For a first example, for a torque signal with a value of 5 N-m, performance capability of 1 for the first ECU 34, and a performance capability of 0.25 for the second ECU 36 (such as because $V_{max}<V_{threshold}$ in the table above), the torque-scaling value for the first ECU 34 is 0.875. For a second example, for a torque signal with a value of 5 N-m, performance capability of 1 for the first ECU 34, and a performance capability of 0 for the second ECU (such as because of a fault code in the table above), the torque-scaling value for the first ECU 34 is 1.

Next, or after the decision block 320 if the second ECU 36 has a full performance capability, in a block 330, the computer 40 instructs the first and second ECUs 34, 36 to provide output signals to the steering-system motor 38. The first and second ECUs 34, 36 will each attempt to provide an output signal with a value that is the product of the torque-scaling value and the value of the torque signal. If the torque-scaling values were not modified in the block 325, then the first and second ECUs 34, 36 will each provide one-half of the value of the torque signal to the steering-system motor 38. The values of the output signals will be less than the value of torque signal weighted by the torque-scaling value if the first ECU 34 or second ECU 36 has a reduced performance capability. The value of the output signal for each of the ECUs 34, 36 is equal to approximately the product of the value of the torque signal, the respective performance capability, and the respective torque-scaling value, up to a maximum value, e.g., 3 N-m. The maximum value may be a physical property of the first and second ECUs 34, 36. If the value of the output signal would be greater than the maximum value, e.g., 4.375 N-m, the first ECU 34 or second ECU 36 instead provides an output signal equal to the maximum value. Continuing the first example from the block 325, for a torque-scaling value of 0.875, the calculated output signal of the first ECU 34 has a value of 0.875*1*5 N-m=4.375 N-m, the value of the output signal of the first ECU 34 would in fact be 3 N-m, and the value of the output signal of the second ECU 36 would be 0.5*0.25*5 N-m=0.625 N-m, for a combined output signal of 3.625 N-m. The combined output signal has a value of 3.625 N-m, which is greater than the value of the combined output signal of 3.125 N-m without modified torque-scaling values and closer to the value of the torque signal of 5 N-m. The output signals cause the steering-system motor 38 to actuate with a torque of approximately 3.625 N-m, and the steering system 44 thus changes the steering angle of the road wheels 52. Continuing the second example from the block 325, for a torque-scaling value of 1, the calculated output signal of the first ECU has a value of 1*1*5 N-M=5 N-m, the value of the output signal of the first ECU 34 would in fact be 3 N-m, and the value of the output signal of the second ECU 36 would be 0.5*0*5 N-m=0 N-m, for a combined output signal of 3 N-m, which is greater than the combined output signal of 2.5 N-m without modified torque-scaling values and closer to the value of the torque signal of 5 N-m. The output signals cause the steering-system motor 38 to actuate with a torque of approximately 3 N-m, and the steering system 44 thus changes the steering angle of the road wheels 52. After the block 330, the process 300 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   first and second ECUs each electrically connected to a steering-system motor; and
   a computer programmed to instruct the first and second ECUs to each provide one-half of a value of a torque signal to the steering-system motor upon determining that both ECUs have a full performance capability.

2. The system of claim 1, wherein the steering-system motor is a six-phase electric motor.

3. The system of claim 2, wherein the first ECU is electrically connected to a set of three coil pairs of the steering-system motor, and the second ECU is electrically connected to a set of the other three coil pairs of the steering-system motor.

4. The system of claim 1, wherein the steering-system motor is a steer-by-wire torque actuator.

5. The system of claim 1, wherein the steering-system motor is an electric power-assist steering motor.

6. The system of claim 1, wherein the computer is further programmed to instruct the first ECU to provide more than one-half of the value of the torque signal to the steering-system motor upon determining that the second ECU has a reduced performance capability.

7. The system of claim 6, wherein the computer is further programmed to calculate a torque-scaling value for the first ECU, and instruct the first ECU to provide the torque-scaling value multiplied by the value of the torque signal to the steering-system motor upon determining that the second ECU has a reduced performance capability, wherein the torque-scaling value compensates for the reduced performance capability of the second ECU.

8. The system of claim 7, wherein the torque-scaling value has a maximum value of 1.

9. The system of claim 7, wherein the torque-scaling value equals a difference of 1 and a product of one-half and the reduced performance capability of the second ECU, divided by the performance capability of the first ECU.

10. The system of claim 6, wherein the computer is further programmed to instruct the second ECU to provide more than one-half of the value of the torque signal to the steering-system motor upon determining that the first ECU has a reduced performance capability.

11. A computer comprising a processor and a memory storing processor-executable instructions, the processor programmed to:
    instruct first and second ECUs to each provide one-half of a value of a torque signal to a steering-system motor upon determining that both ECUs have a full performance capability; and
    instruct the first ECU to provide more than one-half of the value of the torque signal to the steering-system motor upon determining that the second ECU has a reduced performance capability.

12. The computer of claim 11, wherein the processor is further programmed to calculate a torque-scaling value for the first ECU, and instruct the first ECU to provide the torque-scaling value multiplied by the value of the torque signal to the steering-system motor based on determining that the second ECU has a reduced performance capability, wherein the torque-scaling value compensates for the reduced performance capability of the second ECU.

13. The computer of claim 12, wherein the torque-scaling value has a maximum value of 1.

14. The computer of claim 12, wherein the torque-scaling value equals a difference of 1 and a product of one-half and the reduced performance capability of the second ECU, divided by the performance capability of the first ECU.

15. The computer of claim 11, wherein the processor is further programmed to instruct the second ECU to provide more than one-half of the value of the torque signal to the steering-system motor upon determining that the first ECU has a reduced performance capability.

16. A method comprising:
   instructing first and second ECUs to each provide one-half of a value of a torque signal to a steering-system motor upon determining that both ECUs have a full performance capability; and
   instructing the first ECU to provide more than one-half of the value of the torque signal to the steering-system motor upon determining that the second ECU has a reduced performance capability.

17. The method of claim 16, further comprising calculating a torque-scaling value for the first ECU, and instructing the first ECU to provide the torque-scaling value multiplied by the value of the torque signal to the steering-system motor based on determining that the second ECU has a reduced performance capability, wherein the torque-scaling value compensates for the reduced performance capability of the second ECU.

18. The method of claim 17, wherein the torque-scaling value has a maximum value of 1.

19. The method of claim 17, wherein the torque-scaling value equals a difference of 1 and a product of one-half and the reduced performance capability of the second ECU, divided by the performance capability of the first ECU.

20. The method of claim 16, further comprising instructing the second ECU to provide more than one-half of the value of the torque signal to the steering-system motor upon determining that the first ECU has a reduced performance capability.

\* \* \* \* \*